United States Patent [19]
LeDevehat

[11] Patent Number: 5,507,313
[45] Date of Patent: Apr. 16, 1996

[54] ZERO-SPILL DOUBLE BALL VALVE POWERED EMERGENCY RELEASE COUPLING

[75] Inventor: Eugene LeDevehat, Saligny, France

[73] Assignee: FMC Corp., Chicago, Ill.

[21] Appl. No.: 337,918

[22] Filed: Nov. 10, 1994

[30] Foreign Application Priority Data

Jan. 5, 1994 [FR] France .................................. 94 00056

[51] Int. Cl.$^6$ ................................................. F16L 29/00
[52] U.S. Cl. ................................ 137/614.05; 137/614.06
[58] Field of Search ........................... 137/614.05, 614.06

[56] References Cited

U.S. PATENT DOCUMENTS 4,335,747  6/1982  Mitsumoto et al. ............... 137/614.06
4,515,182  5/1985  LeDevehat .
4,664,149  5/1987  Fremy ............................. 137/614.05 X

FOREIGN PATENT DOCUMENTS

0228763A1  9/1986  European Pat. Off. .
2162270    1/1986  United Kingdom .

Primary Examiner—John C. Fox

[57] ABSTRACT

An improved double ball valve powered emergency release coupling includes two fluid-carrying conduits, each having a ball or plug valve received therein, which are prevented from being decoupled unless both ball or plug valves are moved to a closed position prior to decoupling. The improved coupling prevents inadvertent spilling during decoupling. A mechanical or hydraulic actuator corresponding to each valve element is provided for sequentially rotating each valve element between opened and closed positions.

16 Claims, 4 Drawing Sheets

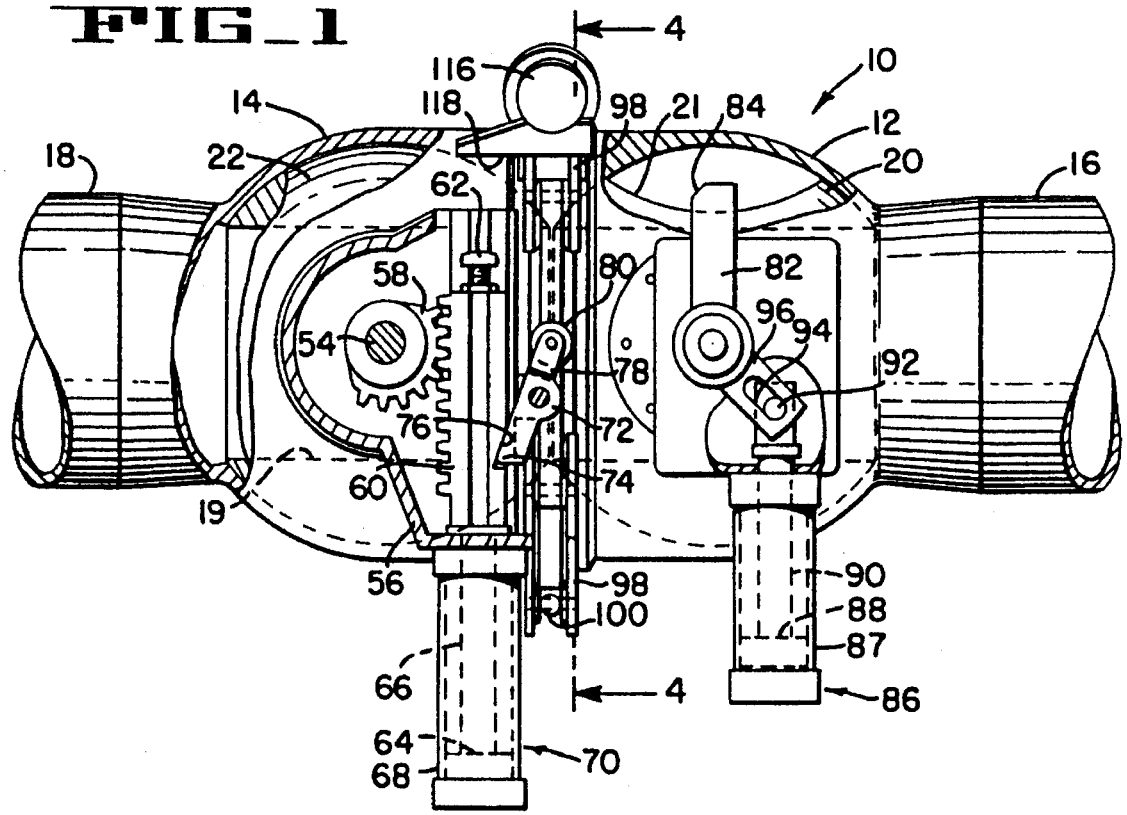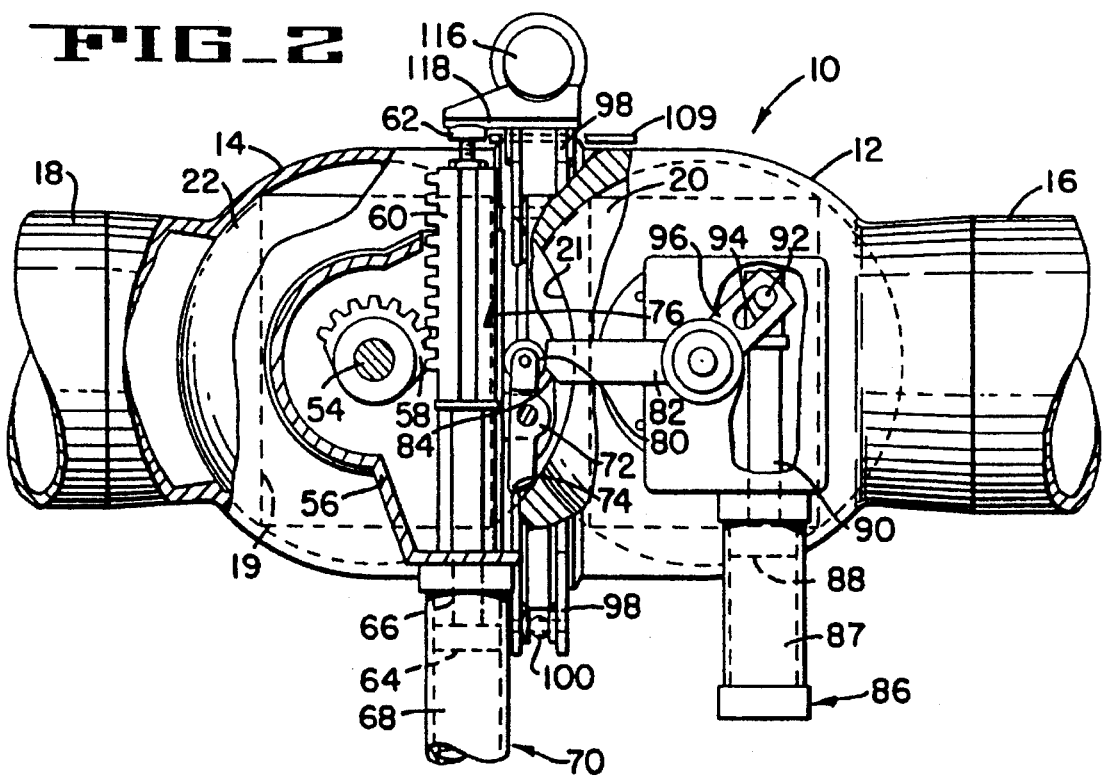

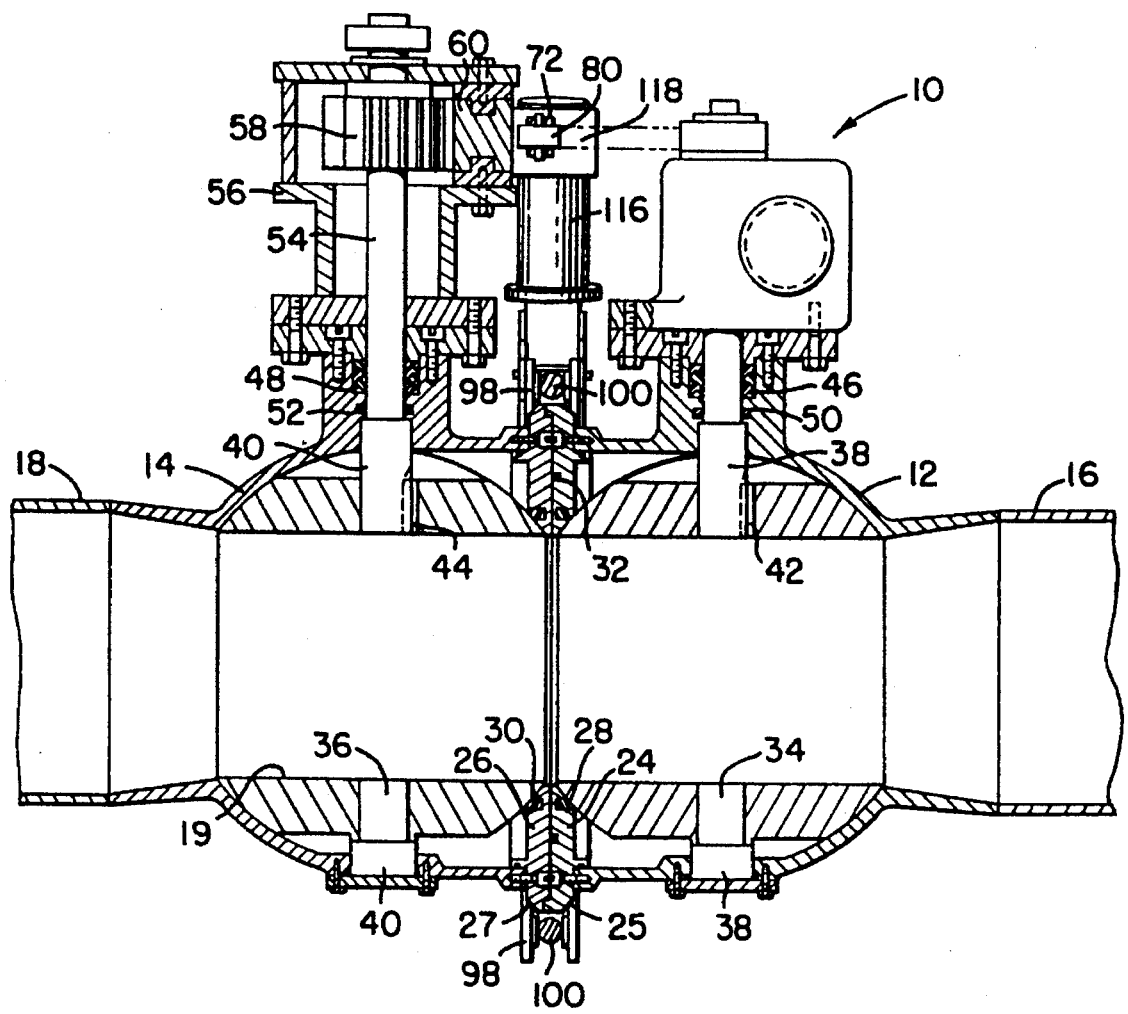
FIG_3

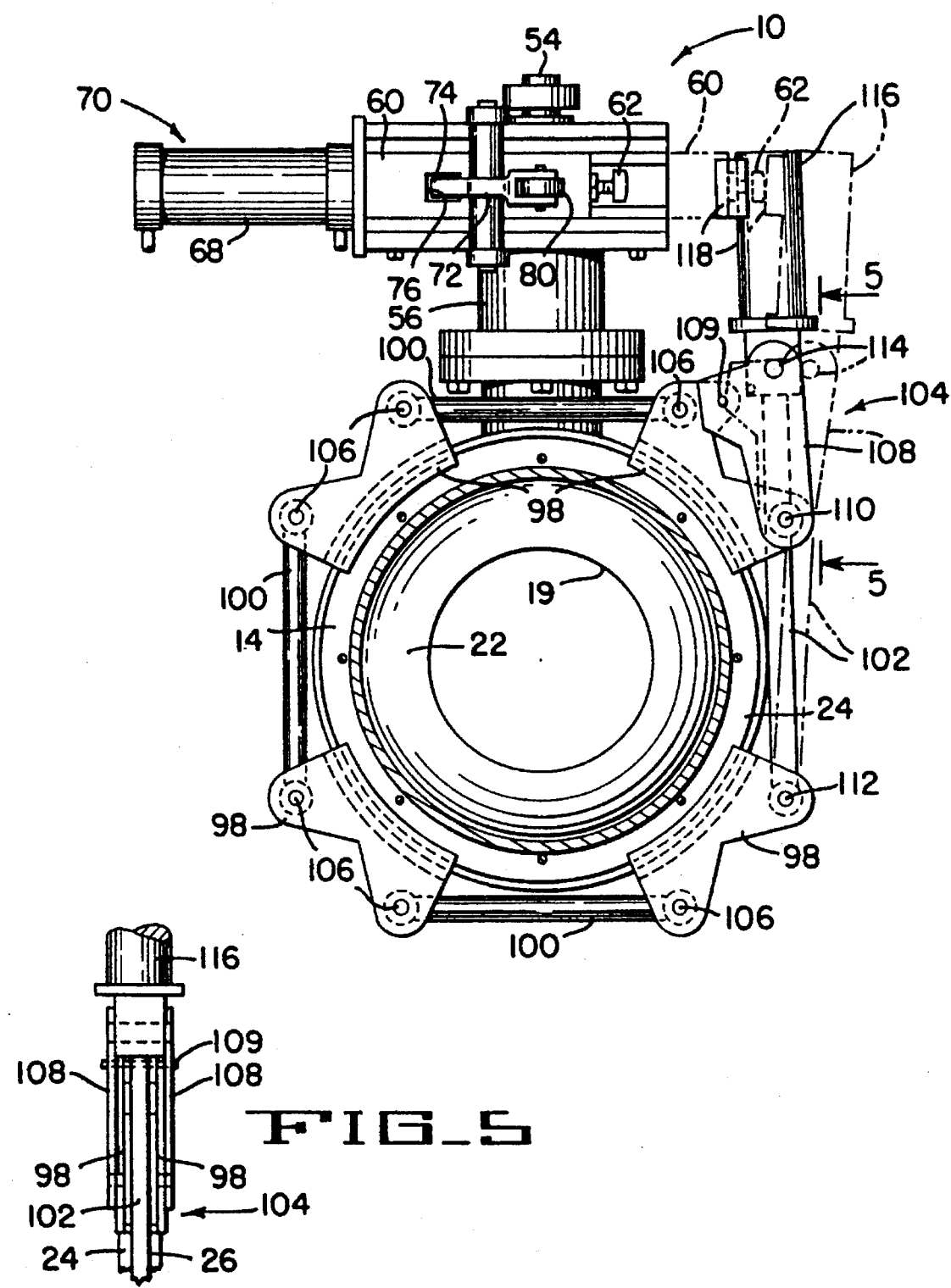

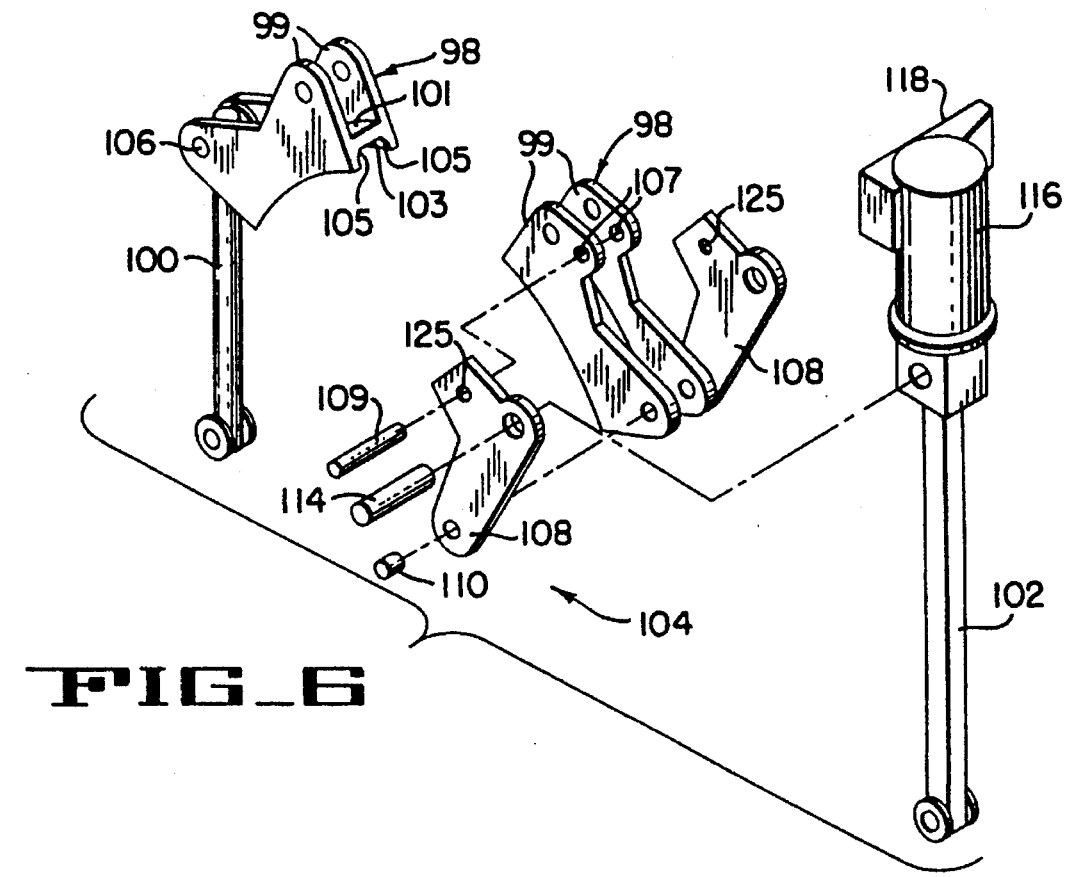
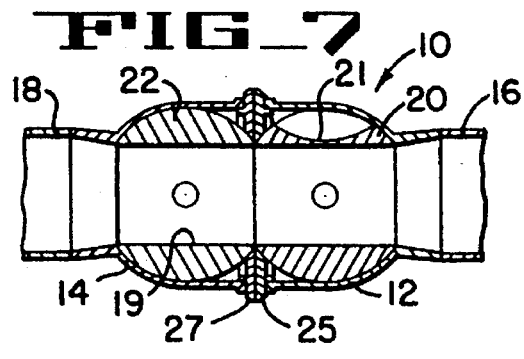
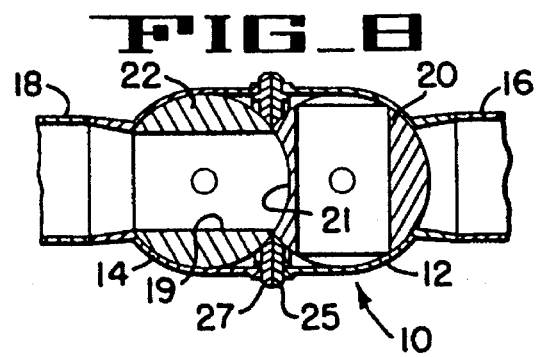
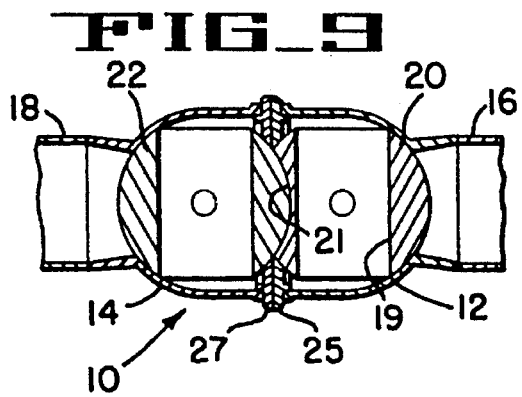
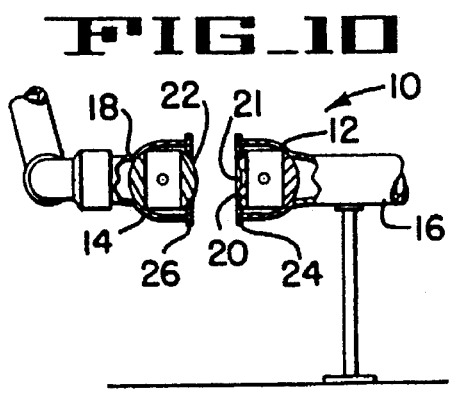

ZERO-SPILL DOUBLE BALL VALVE POWERED EMERGENCY RELEASE COUPLING

BACKGROUND OF THE INVENTION

The present invention relates generally to fluid coupling devices for coupling the ends of two fluid-carrying conduits, and, more particularly, to an improved zero-spill double ball valve powered emergency release coupling in which two fluid-carrying conduits, each having a ball or plug valve received therein, are prevented from being decoupled unless both ball or plug valves are moved to a closed position prior to decoupling.

Coupling devices utilizing rotary valve elements that move between open and closed positions to regulate fluid flow are generally known. A problem exists where, upon closing of the two valve elements in such a coupling prior to decoupling, a certain amount of fluid becomes trapped in the flow passage between the two valve elements. Upon separation of the coupling or conduit ends, the trapped fluid may leak into the environment. To address this problem, it is known to use complementary ball valve elements in which one of the valve elements has a concave recess extending radially inward from its outer surface which is adapted to receive a convex portion of the other ball valve when the coupling ends are joined. The use of such complementary valve elements requires, however, that the valve element having the concave recess is closed first, positioning the concave recess adjacent to the other valve element in order to receive the convex portion. If the coupling is disconnected prior to proper zero-spill positioning of the valve elements spilling may occur. Thus, when the need arises to quickly separate the zero-spill coupling in emergency situations, the coupling must be provided with fail-safe means for regulating the closing sequence of the valve elements prior to separation and for preventing disconnection of the coupling prior to zero-spill positioning of the valve elements.

SUMMARY OF THE INVENTION

The present invention provides fail-safe means for regulating the closing sequence of ball valve elements in a fluid coupling during quick disconnection in emergency situations and for preventing disconnection of the coupling until the valve elements are rotated to zero-spill position.

The present invention includes two open-ended fluid conduit ends adapted for coupling in sealing engagement. The conduit ends each contain a ball valve element adapted to cooperate with the other ball valve element in a zero-spill manner. A mechanical or hydraulic actuator corresponding to each valve element is provided for rotating each valve element between opened and closed positions. A mechanical connection is provided between the actuators to regulate the operating sequence of one of the actuators in response to the other actuator. A locking mechanism for preventing decoupling prior to zero-spill positioning of valve elements includes a shear pin designed to shear, enabling disconnection of the coupling, when a predetermined force is imparted on the mechanism by a plunger carried by one of the actuators.

BRIEF DESCRIPTION OF THE DRAWINGS

FIG. 1 is a top view of the present invention coupling device showing both ball valve elements in an open flow position.

FIG. 2 is a top view of the present invention coupling device showing both ball valve elements in a zero-spill closed flow position.

FIG. 3 is an axial sectional view of the present invention coupling device showing both ball valve elements in an open flow position, as in FIG. 1.

FIG. 4 is a radial sectional view along the plane 4—4 in FIG. 1.

FIG. 5 is a view of the toggle connected to the elongated rod along the plane 5—5 in FIG. 4.

FIG. 6 is an exploded isometric view of the toggle in connection with the elongated rod and a link member.

FIG. 7 is an axial sectional view of the ball valve elements both in an open flow position.

FIG. 8 is an axial sectional view of the ball valve elements in an ordinary operating condition closed flow position.

FIG. 9 is an axial sectional view of the ball valve elements in an emergency disconnect position.

FIG. 10 is an axial sectional view of the coupling disconnected under emergency disconnection conditions.

DETAILED DESCRIPTION OF THE PREFERRED EMBODIMENT

Referring to FIG. 1, a coupling device (10) includes first and second fluid conduit ends (12, 14) for joining fluid conduits (16, 18) forming a fluid flow path. Each conduit end (12, 14) is shaped to house a ball or plug type valve element. In the embodiment shown, a ball valve (20, 22) having a tunnel-shaped passage (19) is used.

As shown in FIG. 3, each conduit end (12, 14) is provided with a mating collar (24, 26) designed to matingly fit in sealing contact with each other when the conduit ends are joined. The inner radial surface of each mating collar is configured to the contour of the valve element (20, 22) in order to form a seal. Elastomer seal elements (28, 30) can be provided to enhance sealing with the valve elements (20, 22). An additional elastomer seal element (32) can be provided between the mating collars (28, 30) to improve sealing. Each ball valve (20, 22) is rotatably received in the respective conduit end (12, 14). The first ball valve (20) has a concave recess (21) extending radially inward from its outer surface which is adapted to receive a portion of the convex outer surface of the other ball valve (22) when the conduit ends (12, 14) are joined. As will be discussed below, this feature is provided to prevent the trapping of fluid between the two ball valves (20, 22) prior to emergency disconnection. A lower spindle (34, 36) cooperating with bearing means (38, 40) is mounted at the lower end of each ball valve (20, 22) enabling rotation of each ball valve (20, 22) relative to the respective conduit end (12, 14). An upper spindle (38, 40) is connected to each ball valve (20, 22) by a key type connection (42, 44) which, in turn, is rotatably supported relative to the respective conduit end (12, 14). Additional sealing elements (46, 48, 50, 52) can be provided to seal between each upper spindle (38, 40) and the respective conduit end (12, 14).

As shown in FIG. 3, an extension shaft (54) extends from the second upper spindle (40) up into a drive housing (56). The extension shaft (54) is provided with a gear (58) for transmitting rotational force to open or close the second ball valve (22). The rotational force provided to the gear (58) is transmitted through a gear rack (60) which is fixed for translation with a plunger (62). The plunger (62) is fixed to a piston (64) and rod (66) which are housed in a closed cylinder (68) comprising a second actuator (70). The actuator (70) may be any suitable type, such as pneumatic or mechanical, for transmitting force linearly.

As shown in FIG. S 1–2, a latch (72) for locking the actuator (70) to prevent the plunger (62) and gear rack (60) from being activated is pivotally mounted on the second conduit end (14). A first end (74) of the latch (72) is configured to be received in a notch (76) on the gear rack (60). The second end (78) of the latch (72) carries a cam disc (80) for being contacted to cause the latch (72) to pivot such that the first end (74) moves out of engagement with the notch (76) to unlock the actuator (70).

A lever arm (82) is pivotally mounted on the first conduit end (12). The lever arm (82) has a beveled end (84) designed to contact the cam disc (80) to pivot latch (72). The lever arm (82) is pivoted by a first actuator (86). The actuator (86) may be any suitable type, such as pneumatic or mechanical, for transmitting force linearly. The actuator (86) comprises a cylindrical housing (87) and a piston (88) and rod (90) which move linearly upon activation. Near the end of the rod (90) is a pin (92) which cooperates with a slot (94) on a radially extending portion (96) of the lever arm (82) to cause the lever arm (82) to pivot in response to the linear movement on the piston (88) and rod (90).

A plurality of linked members (98, 100, 102, 104) for securing the two conduit ends (12, 14) together are shown in FIG. 4. A plurality of link elements (98) are pivotally linked to rods (100) by pins (106) or other suitable means, such that each rod (100) is adjacent to a link element (98) on each side. While the number of link elements (98) and rods (100) may vary, the present embodiment includes four link elements (98) and three rods (100). At a first end of the linked rods (100) and link elements (98) toggle means (104) comprising two plates (108), shown in FIG. 5, are pivotally linked at one end to a link member (98) by a pin (110) or other suitable means. At the other end of the linked rods (100) and link elements (98) an elongated rod (102) is pivotally linked at one end to a link element (98) by a pin (112) or other suitable means. The other end of each of the toggle means (104) and the elongated rod (102) are pivotally linked to each other by a pin (114) or other suitable means, such that the linked rods (100), link elements (98), elongated rod (102), and toggle means (104) form a closed loop. Mounted on the upper end of the elongated rod (102) is a cylindrical extension (116) having an impact surface (118). As shown in FIG. 6, each link element (98) comprises two plates (99), an integrally formed middle portion (101), and an inner circumferential groove (103) having beveled sides (105) adapted to fit over the beveled edges (25, 27) of the mating collars (24, 26) when the two mating collars (24, 26) are engaged with each other.

In order to lock the coupling device (10) over the joined conduit ends (12, 14) the mating collars (24, 26) are joined together as shown clearly in FIG. 3. The link elements (98) are positioned around the circumference of the mating collars (24, 26) such that the beveled edges (25, 27) of the mating collars (24, 26) are received in the grooves (103) of the link elements (98). Next, the elongated rod (102) is pivoted about the pin (112) that connects it to a link element (98) in a direction toward the link element (98) to which the toggle means (104) are connected. This pivoting of the elongated rod (102) causes the toggle means (104) to pivot about the pin (110) connecting it to a link element (98) in the same direction as the elongated rod (102). The pivoting of both the elongated rod (102) and the toggle means (104) causes the overall circumferential length of the linked members (98, 100, 102, 104) to be reduced, exerting compression on the outer circumference of the mating collars (24, 26). The compression exerted on the mating collars (24, 26) is redirected by the beveled surfaces (25, 27) in cooperation with the beveled portions (105) of the link element groove (103) such that the mating collars (24, 26) are pressed against each other in sealing contact. The toggle means (104) are pivoted to a position where a hole (125) in each plate (108) is aligned with a hole (107) in each plate (99) of the link element (98). A shear pin (109) is inserted through the holes (125, 107) in order to lock the toggle means (104) to the link element (98). In this position, the coupling device (10) is locked and the conduit ends (12, 14 ) are joined.

To regulate fluid flow under normal operating conditions, the ball valves (20, 22) are positioned as shown in FIG. S 7–8. FIG. 7 shows both ball valves (20, 22) in the open position to allow fluid flow. FIG. 8 shows the stop flow position under normal conditions, whereby the first ball valve 20 is closed and the second ball valve (22) remains opened.

In an emergency situation when it is desired to quickly disconnect the coupling, both ball valves (20, 22) are turned to a closed position as shown in FIG. 9 so that the concave recess (21) of the first ball valve (20) receives the outer convex surface of the second ball valve (22) in order to prevent fluid from being trapped between the ball valves (20, 22). The cooperation of the second actuator (70) and the linked members (98, 100, 102, 104) prevents release of the linked members (98, 100, 102, 104) prior to closing of both ball valves (20, 22).

To execute emergency decoupling, the first actuator (86) is activated, causing the piston (88) and rod (90) to advance linearly. The linear movement of the rod (90) causes the pin (92) to move within the slot (94) of the extending portion (96) of the lever arm (82), causing the lever arm (82) and the upper spindle (38) and first ball valve (20) to pivot. Upon full extension of the piston (88) and rod (90), the first ball valve (20) is pivoted to a fully closed position and the lever arm (82) is pivoted to contact and release the latch (72) as shown in FIG. 2. When the latch (72) is released, the second actuator (70) is activated causing the piston (64) and rod (66) to advance linearly. The linear movement of the rod (66) causes the gear rack (60) and plunger (62) to advance. The gear rack (60) causes rotation of the gear (58) with which it is engaged, causing the upper spindle (40) and second ball valve (22) to pivot until the ball valve (22) is in a fully closed position, as shown in FIG. 9. As the ball valve (22) reaches the fully opened position, the plunger (62) contacts the impact surface (118), as shown in FIG. 2. The force exerted on the impact surface (118) by the plunger (62) causes the elongated rod (102) to pivot about pin (112)in a direction away from the toggle means (104) such that the shear pin (109) is stressed, causing it to shear. Once the shear pin (109) is sheared, the elongated rod continues to pivot about the pin (112) and the toggle means (104) pivot about the pin (110), increasing the effective circumferential length of the linked members (98, 100, 102, 104). The increase circumferential length of the linked members (98, 100, 102, 104) releases the pressure on the mating collars (24, 26) such that the conduit ends (12, 14) may be separated as shown in FIG. 10.

Although the best mode contemplated for carrying out the present invention has been herein shown and described, it will be apparent that modification and variation may be made without departing from what is regarded to be the subject matter of the invention.

What is claimed is:

1. An emergency-release fluid coupling assembly for coupling two fluid-carrying members, a ball valve received therein, said assembly comprising:

first and second fluid-carrying members (16, 18) each having an open end (12, 14), said ends (12, 14) being adapted to sealingly engage each other;

first and second rotating ball valves (20, 22) received, respectively, in said first and second fluid-carrying member open ends (12, 14), each of said ball valves (20, 22) being rotatable between open and closed positions;

coupling means (98, 100, 102, 104) for holding said first and second fluid-carrying members (16, 18) in engagement with each other and for selectively preventing decoupling of said first and second fluid-carrying members (16, 18) from engagement with each other;

said coupling means comprising a first flat mating (24) attached to said first conduit end (12), a second flat mating collar (26) attached to said second conduit end (14), corresponding to and aligned for engagement with said first flat mating collar (24), and securing means (98) for securing said first and second flat mating collars to each other to hold said conduit ends in sealed engagement with each other;

said securing means comprising flexible compression means (98, 100, 102, 104) forming a closed loop in circumferential engagement with said first and second flat mating collars (24, 26), means (102, 104) for selectively adjusting said closed loop to a position of decreased circumferential length thereby applying a compressive force to said collars (24, 26) and causing said first and second flat mating collars (24, 26) to be biased into engagement with each other, and means (105, 107, 109) for locking said closed loop in said position of decreased circumferential length;

releasing means (62, 109) for selectively enabling decoupling of said first and second fluid-carrying members (16, 18) only when each of said first and second ball valves (20, 22) is in a closed position;

said first and second flat mating collars (24, 26) each having a beveled outer edge (25, 27) on the side opposite said first open end (12) and said second open end (14), respectively;

said compression means (98, 100, 102, 104) having an inner groove (103) with beveled portions (105) corresponding to said beveled edges (25, 27) of said first and second flat mating collars (24, 26) such that said beveled portions cooperate with said beveled outer edges to transmit said compressive force along an axis generally perpendicular to said compressive force, biasing said first and second mating collars (24, 26) into engagement with each other; and said flexible compression means comprising a plurality of rods (100), a plurality of link elements (98), one elongated rod (102), toggle means (104), means (106) for pivotally linking said rods and link elements in an alternating fashion to form one elongated chain having a link element at each end, means (114) for pivotally linking said elongated rod at a point near a first end of said elongated rod to a first end of said toggle means, means (112) for pivotally linking a second end of said elongated rod to the link element (98) located at a first end of said chain, means (110) for pivotally linking a second end of said toggle means to the link element located at a second end of said chain.

2. A fluid coupling assembly according to claim 1, wherein each of said first and second ball valves comprises a generally spherical body (20, 22) rotatable about a vertical axis; and a tunnel-shaped passage (21) concentrically centered about a horizontal axis perpendicular to said vertical axis.

3. A fluid coupling assembly according to claim 1, wherein said flexible compression means comprise a plurality of linked members (98, 100, 102, 104) pivotally joined to form a closed loop.

4. A fluid coupling assembly according to claim 1, wherein said decrease in circumferential length is effected by rotation of said elongated rod (102) about said first end of said chain in a first direction toward said toggle means (104), thereby causing said toggle means to rotate about said second end of said chain in the same rotational direction.

5. A fluid coupling assembly according to claim 4, wherein said means for locking said closed loop in said position of decreased circumferential length comprise shear locking means (109) for locking said toggle means (104) in a fixed position relative to said second end of said chain.

6. A fluid coupling assembly according to claim 5, wherein said shear locking means comprise a shear pin (109) inserted through a hole (105) in said toggle means and through a generally central hole (107) in the link element at the second end of said chain, said shear pin adapted to shear when subjected to a predetermined shear load.

7. A fluid coupling assembly according to claim 6, wherein said toggle means comprise two flat plates (108) arranged in parallel on opposite sides of said elongated rod ( 102);

said flat plates each having a first end and a second end;

said plates each having a hole (107) formed through a section generally between said first and second ends for receiving said shear pin (109).

8. A fluid coupling assembly according to claim 6, wherein said releasing means comprise means (62) for selectively applying force to said first end of said elongated rod in a second direction opposite said first direction imparting force upon said toggle means (104) causing said shear pin (109) to shear, whereby upon shearing of said pin said toggle means and said elongated rod (102) are rotated in said second direction causing the circumferential length of said closed loop to increase.

9. A fluid coupling according to claim 8, wherein said means for selectively applying force to said first end of said elongated rod comprise a first actuator (70) having a first plunger (62) adapted to extend into contact and apply force to said first end (118) of said elongated rod when said actuator is activated;

locking means (72) for holding said first plunger in a retracted position;

a second actuator (86) having means (82) for releasing said locking means when said second actuator is activated.

10. A fluid coupling according to claim 9, wherein said locking means comprise a latch (72) pivotally mounted on said second fluid-carrying member (18), said latch adapted to engage a notch (76) on said first plunger when said plunger is in a retracted position.

11. A fluid coupling assembly according to claim 10, wherein said means for releasing said locking means comprises a lever (82) pivotally mounted on said first fluid-carrying member adapted to pivot, upon activation of said second actuator (86), into engagement with said latch thereby causing said latch to pivot out of engagement with said first plunger.

12. A fluid coupling assembly according to claim 11, comprising means (86) for driving said first rotating ball valve between an open and closed position responsive to said first actuator;

means (70) for driving said second rotating ball valve between an open and closed position responsive to said second actuator.

13. A fluid coupling assembly according to claim 12, wherein said means for driving said second rotating ball valve comprise a rotatable geared shaft (54) mounted on said first fluid-carrying member to which said first rotating ball valve is fixed, forming a vertical axis about which said first rotating ball valve rotates;

a gear rack (60) formed on said plunger, cooperating with said geared shaft such that when said plunger extends or retracts said geared shaft rotates.

14. A fluid coupling assembly according to claim 12, wherein said means for driving said first rotating ball comprise a rotatable shaft (38) mounted on said second fluid-carrying member to which said second rotating ball valve is fixed forming a vertical axis about which said second ball valve rotates;

an arm (82) having a slot (94), said arm fixed to said shaft and extending in a generally horizontal plane;

a pin (92) formed on the end of a piston rod (90) associated with said second actuator and received in said slot such that when said rod (90) extends or retracts, said pin and slot cooperate to cause said shaft to rotate.

15. A fluid coupling assembly according to claim 11, wherein said first and second ball valves (20, 22) are in an open position when, respectively, said second actuator (86) and said first actuator (70) are in a retracted position; and said first and second ball valves are in a closed position when, respectively, said second actuator and said first actuator are in a retracted position.

16. A fluid coupling assembly according to claim 15, wherein said first ball valve (20) is adapted to open and close independently of said second (22) ball valve.

* * * * *